US012583208B2

(12) United States Patent
Ishiuchi et al.

(10) Patent No.: US 12,583,208 B2
(45) Date of Patent: Mar. 24, 2026

(54) MULTILAYER STRUCTURE, PACKAGING MATERIAL IN WHICH SAME IS UTILIZED, REGRIND COMPOSITION, AND METHOD FOR PRODUCING REGRIND COMPOSITION

(71) Applicant: KURARAY CO., LTD., Okayama (JP)

(72) Inventors: Satoshi Ishiuchi, Kurashiki (JP); Makoto Suzuki, Kurashiki (JP); Minoru Okamoto, Kurashiki (JP); Yuriko Mizutani, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 153 days.

(21) Appl. No.: 18/019,605

(22) PCT Filed: Aug. 2, 2021

(86) PCT No.: PCT/JP2021/028676

§ 371 (c)(1),
(2) Date: Feb. 3, 2023

(87) PCT Pub. No.: WO2022/030465

PCT Pub. Date: Feb. 10, 2022

(65) Prior Publication Data

US 2024/0269969 A1 Aug. 15, 2024

(30) Foreign Application Priority Data

Aug. 4, 2020 (JP) ................................ 2020-132090

(51) Int. Cl.

*B32B 27/08* (2006.01)
*B32B 7/12* (2006.01)
*B32B 27/18* (2006.01)
*B32B 27/30* (2006.01)
*B32B 27/32* (2006.01)

(52) U.S. Cl.

CPC ................ *B32B 27/08* (2013.01); *B32B 7/12* (2013.01); *B32B 27/18* (2013.01); *B32B 27/306* (2013.01); *B32B 27/327* (2013.01); *B32B 2250/02* (2013.01); *B32B 2250/246* (2013.01); *B32B 2307/51* (2013.01); *B32B 2307/7376* (2023.05)

(58) Field of Classification Search

CPC ........... B32B 7/12; B32B 27/08; B32B 27/18; B32B 27/306; B32B 27/327; B32B 2307/51; B32B 2307/7376; B32B 2250/02; B32B 2250/246

See application file for complete search history.

(56) References Cited

U.S. PATENT DOCUMENTS

| | | | | |
|---|---|---|---|---|
| 6,083,629 | A * | 7/2000 | Kuroda | B29C 48/185 428/476.3 |
| 7,683,135 | B2 | 3/2010 | Uchiumi et al. | |
| 9,346,940 | B2 | 5/2016 | Inomata et al. | |
| 11,248,112 | B2 | 2/2022 | Komuro | |
| 11,401,355 | B2 | 8/2022 | Yoshida et al. | |
| 2003/0060550 | A1 | 3/2003 | Inomata et al. | |
| 2005/0096419 | A1 | 5/2005 | Inomata et al. | |
| 2007/0106031 | A1 | 5/2007 | Uchiumi et al. | |
| 2009/0247679 | A1 | 10/2009 | Inomata et al. | |
| 2010/0080943 | A1 | 4/2010 | Jradnisheck | |
| 2014/0316039 | A1 | 10/2014 | Inomata et al. | |
| 2018/0194876 | A1 | 7/2018 | Yoshida et al. | |
| 2020/0172712 | A1 | 6/2020 | Komuro | |
| 2020/0339771 | A1 | 10/2020 | Hasegawa et al. | |
| 2021/0269209 | A1 | 9/2021 | Suzuki | |

FOREIGN PATENT DOCUMENTS

| | | | |
|---|---|---|---|
| JP | 2001-79996 | A | 3/2001 |
| JP | 2012-504689 | A | 2/2012 |
| JP | 2015-063704 | A | 4/2015 |
| JP | 6719031 | B1 | 7/2020 |
| WO | 2004/092234 | A1 | 10/2004 |
| WO | 2017/047559 | A1 | 3/2017 |
| WO | 2019/083000 | A1 | 5/2019 |
| WO | 2019/131844 | A1 | 7/2019 |
| WO | 2020/040281 | A1 | 2/2020 |
| WO | 2020/071513 | A1 | 4/2020 |

OTHER PUBLICATIONS

Translation of JP6719031. (Year: 2020).*
International Search Report issued in corresponding International Patent Application No. PCT/JP2021/028676 dated Oct. 12, 2021.
Written Opinion issued in corresponding International Patent Application No. PCT/JP2021/028676 dated Oct. 12, 2021.

* cited by examiner

*Primary Examiner* — Catherine A. Simone
(74) *Attorney, Agent, or Firm* — Morgan, Lewis & Bockius LLP

(57) ABSTRACT

The present disclosure provides a multilayer structure having: a polyolefin layer (A); an adhesive resin layer (B); and a resin composition layer (C), wherein the polyolefin layer (A) is laminated on at least one face of the resin composition layer (C) via the adhesive resin layer (B).

19 Claims, No Drawings

MULTILAYER STRUCTURE, PACKAGING MATERIAL IN WHICH SAME IS UTILIZED, REGRIND COMPOSITION, AND METHOD FOR PRODUCING REGRIND COMPOSITION

TECHNICAL FIELD

The present invention relates to a multilayer structure being superior in mechanical strength and recyclability, and superior in appearance when the multilayer structure is formed into a film: a packaging material in which the multilayer structure is utilized: a regrind composition; and a method for producing a regrind composition.

BACKGROUND ART

A gas barrier resin film constituted from, e.g., an ethylene-vinyl alcohol copolymer (hereinafter, may be referred to as "EVOH") has been conventionally used as a transparent packaging material with superior oxygen barrier properties. Furthermore, taking advantage of thermoformability in addition to superior gas barrier properties, the EVOH has been also used in intended usages such as a laminated packaging material. As the laminated packaging material, for example, a laminated film produced by coextruding a polyamide resin (nylon) on both sides of an EVOH with the aim of enhancing strength of a laminated film is known (Patent Document 1).

Patent Document 2 discloses a multilayer structure constituted from: a hard layer having a piercing strength of 40 N/mm or more and 150 N/mm or less; and a resin composition layer which has an EVOH having a melting point of 170° C. or more, and a modified EVOH having a melting point of less than 170° C. Patent Document 2 discloses that this multilayer structure is superior in mechanical strength and thermoformability, and that when a regrind thereof is melt molded, generation of aggregates due to resin deterioration (gelation), etc. is inhibited, showing superiority in recyclability.

PRIOR ART DOCUMENTS

Patent Documents

Patent Document 1: Japanese Unexamined Patent Application, Publication No. 2001-79996

Patent Document 2: PCT International Publication No. 2020/071513

SUMMARY OF THE INVENTION

Problems to be Solved by the Invention

When the laminated film disclosed in Patent Document 1 is recovered and reused, the polyamide resin and the EVOH undergo crosslinking due to a chemical reaction, whereby aggregates are generated: thus, the laminated film is poor in recyclability. Furthermore, when the multilayer structure disclosed in Patent Document 2 is formed into a film, strong shear stress is generated between an adhesive resin layer and the EVOH layer, whereby unevenness is generated in thickness of the EVOH layer and an interface between layers becomes disordered, resulting in film appearance being unfavorable.

The present invention was made in view of the foregoing problems, and an object of the invention is to provide: a multilayer structure being superior in mechanical strength, recyclability, appearance, and stable moldability: a packaging material in which the multilayer structure is utilized: a regrind composition; and a method for producing a regrind composition.

Means for Solving the Problems

The aforementioned problems can be solved by any of the following:

(1) A multilayer structure having: a polyolefin layer (A): an adhesive resin layer (B); and a resin composition layer (C), wherein the polyolefin layer (A) is laminated on at least one face of the resin composition layer (C) via the adhesive resin layer (B), the multilayer structure has neither a layer in which a resin having a melting point of 210° C. or higher is a principal component, nor a metal layer having a thickness of 1 μm or more, a resin constituting the polyolefin layer (A) is an olefin polymer having a density of 0.850 g/cm$^3$ or more and 0.940 g/cm$^3$ or less, the resin composition layer (C) contains an ethylene-vinyl alcohol copolymer (c1) and a polyvalent metal ion (c2), an ethylene unit content in the ethylene-vinyl alcohol copolymer (c1) is 20 mol % or more and 50 mol % or less, and a degree of saponification of the ethylene-vinyl alcohol copolymer (c1) is 90 mol % or more, a content of the polyvalent metal ion (c2) in the resin composition layer (C) is 10 ppm or more and 400 ppm or less, and the polyvalent metal ion (c2) is at least one selected from the group consisting of a magnesium ion, a calcium ion, a zinc ion, a cobalt ion, and a manganese ion:

(2) The multilayer structure according to (1), wherein the polyvalent metal ion (c2) is contained as a cation of a higher fatty acid metal salt:

(3) The multilayer structure according to (1) or (2), wherein the multilayer structure is in a film form which has a lengthwise direction and a crosswise direction, and of a cross section in the crosswise direction, provided that a site at one end of the crosswise direction is defined as 0)% and a site at an other end of the crosswise direction is defined as 100%, a ratio (Cmin/Cmax) of a minimum value Cmin of a thickness of the resin composition layer (C) to a maximum value Cmax of the thickness, observed in an area of 45% to 55%, is 0.70 or more:

(4) The multilayer structure according to any one of (1) to (3), wherein at least a part of the ethylene-vinyl alcohol copolymer (c1) has at least one of a carboxylic acid unit (I) and a lactone ring unit (II) each being positioned at a polymer end, a total content (i+ii) of the carboxylic acid unit (I) and the lactone ring unit (II) per gram of the ethylene-vinyl alcohol copolymer (c1) is 14 μmol/g or more and 78 μmol/g or less, and a proportion (ii/(i+ii)) of a content (ii) of the lactone ring unit (II) with respect to the total content (i+ii) of the carboxylic acid unit (I) and the lactone ring unit (II) is 40 mol % or more:

(5) The multilayer structure according to any one of (1) to (4), wherein the resin composition layer (C) further contains an aluminum ion (c3), and a content of the aluminum ion (c3) in the resin composition layer (C) is 5 ppb or more and 500 ppb or less.

(6) The multilayer structure according to any one of (1) to (5), wherein the resin composition layer (C) further contains a phosphate ion (c4) and an alkali metal ion (c5), a content of the phosphate ion (c4) in the resin composition layer (C) is 5 ppm or more and 200 ppm or less, and a content of the alkali metal ion (c5) in the resin composition layer (C) is 10 ppm or more and 400 ppm or less, and a content ratio (c4/c5) of the phosphate ion (c4) to the alkali metal ion (c5) is 0.01 or more and 2 or less, and a content ratio (c2/c5) of the polyvalent metal ion (c2) to the alkali metal ion (c5) is 0.1 or more and 5 or less.

(7) The multilayer structure according to (6), wherein a content ratio of the polyvalent metal ion (c2) to the phosphate ion (C4) is 1 or more and 15 or less:

(8) The multilayer structure according to any one of (1) to (7), wherein a thickness of a region, at an interface between the adhesive resin layer (B) and the resin composition layer (C), which has a modulus of elasticity of 0.4 GPa or more and 0.8 GPa or less is 50 nm or less, the modulus of elasticity being measured and analyzed using an atomic force microscope:

(9) The multilayer structure according to any one of (1) to (8), wherein the olefin polymer constituting the polyolefin layer (A) is a linear low-density polyethylene.

(10) The multilayer structure according to (9), wherein the linear low-density polyethylene is polymerized using a metallocene catalyst.

(11) The multilayer structure according to any one of (1) to (10), wherein a ratio of a thickness of the polyolefin layer (A) to a total thickness of total layers is 0.75 or more:

(12) A packaging material constituted from the multilayer structure according to any one of (1) to (11):

(13) A regrind composition containing a regrind of the multilayer structure according to any one of (1) to (11); and

(14) A method for producing a regrind composition, the method including a step of melt kneading a regrind of the multilayer structure according to any one of (1) to (11).

Effects of the Invention

The present invention enables providing: a multilayer structure being superior in mechanical strength, recyclability, appearance, and stable moldability: a packaging material in which the multilayer structure is utilized: a regrind composition; and a method for producing a regrind composition.

DESCRIPTION OF EMBODIMENTS

The multilayer structure of the present invention is a multilayer structure having: a polyolefin layer (A): an adhesive resin layer (B); and a resin composition layer (C), wherein the polyolefin layer (A) is laminated on at least one face of the resin composition layer (C) via the adhesive resin layer (B), the multilayer structure has neither a layer in which a resin having a melting point of 210° C. or higher is a principal component, nor a metal layer having a thickness of 1 μm or more, a resin constituting the polyolefin layer (A) is an olefin polymer having a density of 0.850 g/cm$^3$ or more and 0.940 g/cm$^3$ or less, the resin composition layer (C) contains an ethylene-vinyl alcohol copolymer (c1) and a polyvalent metal ion (c2), an ethylene unit content in the ethylene-vinyl alcohol copolymer (c1) is 20 mol % or more and 50 mol % or less, and a degree of saponification of the ethylene-vinyl alcohol copolymer (c1) is 90 mol % or more, a content of the polyvalent metal ion (c2) in the resin composition layer (C) is 10 ppm or more and 400 ppm or less, and the polyvalent metal ion (c2) is at least one selected from the group consisting of a magnesium ion, a calcium ion, a zinc ion, a cobalt ion, and a manganese ion.

It is to be noted that as referred to herein, the content of each component represented by ppm or ppb is a content on a mass basis. The content ratio of each component is also a content ratio based on a content on a mass basis. Furthermore, the thickness of each layer, etc. (except for the maximum value Cmax and the minimum value Cmin of the thickness) is an average value of values measured at five arbitrary sites.

Polyolefin Layer (A)

The resin being the principal component constituting the polyolefin layer (A) is a polyolefin resin having a density of 0.850 g/cm$^3$ or more and 0.940 g/cm$^3$. Due to the density falling within the above range, the multilayer structure to be obtained has sufficient stretchability, and is superior in piercing strength. The upper limit of the density is preferably 0.930 g/cm$^3$, more preferably 0.920 g/cm$^3$, and particularly preferably 0.910 g/cm$^3$. The lower limit of the density is preferably 0.870 g/cm$^3$, and more preferably 0.880 g/cm$^3$. It is to be noted that the "principal component" as referred to herein means the component having the highest content on a mass basis.

The resin (polyolefin resin) used as the principal component in the polyolefin layer (A) may be exemplified by: homo- or copolymers of an olefin, such as: a linear low-density polyethylene (LLDPE), a low-density polyethylene (LDPE), a very low-density polyethylene (VLDPE), a medium-density polyethylene (MPDE), a high-density polyethylene (HDPE), an ethylene-vinyl acetate copolymer (EVA), an olefin-unsaturated carboxylic acid copolymer ionomer, an ethylene-propylene copolymer, an ethylene-ester acrylate copolymer, a polypropylene, a propylene-α-olefin (α-olefin having 4 to 20 carbon atoms) copolymer, a poly butene, and a polypentene: resins obtained by modifying these homo- or copolymers of an olefin, by grafting with an unsaturated carboxylic acid or an ester thereof; and blends of these. Of these, the linear low-density polyethylene (LLDPE) and the low-density polyethylene (LDPE) are preferred in light of enabling increasing the piercing strength of the polyolefin layer (A), and in particular, the linear low-density polyethylene (LLDPE) is preferred.

The linear low-density polyethylene is particularly preferably a polyethylene (ethylene polymer or copolymer) polymerized by using a metallocene catalyst. The polyethylene (ethylene polymer or copolymer) polymerized by using a metallocene catalyst as referred to means an ethylene homopolymer or a copolymer of ethylene and an α-olefin having 3 or more carbon atoms, and is preferably produced by polymerizing ethylene or copolymerizing ethylene with the α-olefin in the presence of a catalyst formed from a transition metal of group 4 in the periodic table having at least one ligand having a cyclopentadienyl skeleton, preferably a zirconium compound, an organoaluminumoxy compound, and various components which are added as needed.

Examples of the α-olefin having 3 or more carbon atoms in the ethylene copolymer include propylene, 1-butene, 1-pentene, 1-hexene, 1-octene, 1-decene, 1-dodecene, 4-methyl-1-pentene, and the like. As the ethylene copolymer, in particular, a copolymer of an α-olefin having 3 to 12 carbon atoms is preferred.

As the polyethylene (the ethylene polymer or copolymer) polymerized by using a metallocene catalyst, industrially manufactured products are commercially available, and examples thereof include "KERNEL" (manufactured by Japan Polychem Corporation), "EVOLUE" (manufactured by Prime Polymer Co., Ltd.), "Exact" (manufactured by ExxonMobile Chemical), “AFFINITY” and “ENGAGE” (manufactured by Dow Chemical), and the like.

A content of the resin being the principal component in the polyolefin layer (A) is preferably 50% by mass or more, more preferably 80% by mass or more, and still more preferably 90% by mass or more. The content of the resin being the principal component in the polyolefin layer (A) may be 100% by mass or less. The polyolefin layer (A) may contain other optional component(s) such as: a resin other than the polyolefin resin: a heat stabilizer; an ultraviolet ray-absorbing agent: an antioxidant: a colorant: a filler; and/or the like.

A thickness per layer of the polyolefin layer (A) is preferably 10 μm or more and 1 mm or less, more preferably 30 μm or more and 500 μm or less, and still more preferably 50 μm or more and 200 μm or less.

Resin Composition Layer (C)

The resin composition layer (C) is typically a layer having, as a principal component, the EVOH (c1). The ethylene unit content in the EVOH (c1) contained in the resin composition layer (C) is 20 mol % or more and 50 mol % or less. When the ethylene unit content is less than 20 mol %, thermal stability during melt molding may deteriorate, whereby recyclability may worsen. The ethylene unit content is more preferably 22 mol % or more, and still more preferably 25 mol % or more. When the ethylene unit content is more than 50 mol %, the gas barrier properties may be insufficient. The ethylene unit content is more preferably 45 mol % or less, and still more preferably 40 mol % or less. The ethylene unit content in the EVOH (c1) can be determined by a procedure disclosed in EXAMPLES.

The degree of saponification of the EVOH (c1) is 90 mol % or more. When the degree of saponification is less than 90 mol %, a level of crystallization of the EVOH may decrease, whereby the gas barrier properties may deteriorate, and the thermal stability during melt molding may greatly deteriorate. The degree of saponification is suitably 95 mol % or more, more suitably 98 mol % or more, and still more suitably 99 mol % or more. The upper limit of the degree of saponification may be 100 mol %. The degree of saponification of the EVOH (c1) can be determined by a procedure disclosed in EXAMPLES.

At least a part of the EVOH (c1) preferably has at least one of a carboxylic acid unit (I) and a lactone ring unit (II) each being positioned at a polymer end (end of a main chain). The carboxylic acid unit (I) refers to a structural unit having a carboxy group and being positioned at the polymer end. The carboxylic acid unit (I) may be also referred to as a terminal carboxylic acid unit. A part or all of the carboxy groups included in the carboxylic acid unit (I) may be present in the state of a salt or an anion (—$COO^-$). The lactone ring unit (II) refers to a structural unit having a lactone ring and being positioned at the polymer end. The lactone ring unit (II) may be also referred to as a terminal lactone ring unit. The number of ring atoms in the lactone ring is not particularly limited, and the lactone ring may be, for example, a 4- to 6-membered ring, and is preferably a 5-membered ring. The carboxylic acid unit (I) may be, for example, a structural unit represented by the following formula (1). The lactone ring unit (II) may be, for example, a structural unit represented by the following formula (2).

(1)

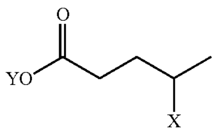

-continued (2)

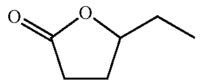

In the formula (1), X represents a hydrogen atom, a hydroxy group, or an esterified hydroxy group; and Y represents a hydrogen atom or a metal atom.

Examples of the esterified hydroxy group which may be represented by X include acyloxy groups such as —OCO—$CH_3$, —OCO—$C_2H_5$, and the like.

Examples of the metal atom which may be represented by Y include atoms of: alkali metals such as sodium; alkaline earth metals such as magnesium and calcium; metals being main group elements such as aluminum; transition metals; and the like. Of these, atoms of the main group elements are preferred, and atoms of the alkali metals, the alkaline earth metals, and aluminum are preferred. In the case in which Y represents an aluminum atom, this aluminum atom is contained in the aluminum ion (c3), and in the case in which Y represents an alkali metal atom, this alkali metal atom is contained in the alkali metal ion (c5). In a case in which Y represents a metal atom having a valency of 2 or more, two or more carboxylate anions (—$COO^-$) may be bonded or coordinated to one Y.

The lower limit of a total content (i+ii) of the carboxylic acid unit (I) and the lactone ring unit (II) per gram of the EVOH (c1), i.e., a total amount (amount of substance; mol number) of the carboxylic acid unit (I) and the lactone ring unit (II) present per gram of the EVOH (A) is preferably 14 μmol/g, more preferably 18 μmol/g, and still more preferably 22 μmol/g. Furthermore, the lower limit of the total content of the carboxylic acid unit (I) and the lactone ring unit (II) in the EVOH (A) with respect to a total content of ethylene units, vinyl alcohol units, and vinyl ester units is preferably 0.10 mol %, more preferably 0.12% mol, and still more preferably 0.14 mol %. When the total content of the carboxylic acid unit (I) and the lactone ring unit (II) is more than or equal to the lower limit, the appearance of the multilayer structure may be improved.

On the other hand, the upper limit of the total content (i+ii) of the carboxylic acid unit (I) and the lactone ring unit (II) per gram of the EVOH (c1) is preferably 78 μmol/g, more preferably 70 μmol/g, still more preferably 60 μmol/g, yet more preferably 50 μmol/g, and particularly preferably 40 μmol/g. Furthermore, the upper limit of the total content of the carboxylic acid unit (I) and the lactone ring unit (II) in the EVOH (A) with respect to the total content of ethylene units, vinyl alcohol units, and vinyl ester units is preferably 0.4 mol %, more preferably 0.3% mol, still more preferably 0.25 mol %, and particularly preferably 0.21 mol % or less. In a case in which the carboxylic acid unit (I) and the lactone ring unit (II) are present in excess, the thermal stability may deteriorate. Specifically, at high temperatures, the carboxylic acid unit (I) and the lactone ring unit (II) may react with the hydroxy group of the EVOH (c1) to produce a branched polymer having a high degree of polymerization. Thus, when the content of the carboxylic acid unit (I) and the lactone ring unit (II) is high, there is a tendency for the melt moldability of the EVOH (c1) to deteriorate. Accordingly, when the total content of the carboxylic acid unit (I) and the lactone ring unit (II) is less than or equal to the upper limit, generation of aggregates during melt molding can be inhibited, whereby the appearance of the multilayer structure to be obtained can be improved.

The lower limit of a proportion (ii/(i+ii): lactone ring unit proportion) of the content (ii) of the lactone ring unit (II) with respect to the total content (i+ii) of the carboxylic acid unit and the lactone ring unit (II) of the EVOH (c1) is preferably 40 mol %, and more preferably 50 mol %. When the lactone ring unit proportion (ii/(i+ii)) is more than or equal to the lower limit, shear stress between the adhesive resin layer (B) and the resin composition layer (C) during melt molding may weaken, whereby the appearance of the multilayer structure may be improved. On the other hand, the upper limit of the lactone ring unit proportion (ii/(i+ii)) may be, for example, 90 mol %, and may be 80 mol % or 70 mol %.

The total content (i+ii) of the carboxylic acid unit (I) and the lactone ring unit (II) per gram of the EVOH (c1) is adjusted in accordance with, for example, polymerization conditions such as a type of polymerization initiator, drying conditions such as a drying atmosphere, and the like. In the EVOH (c1) not having a branched structure, there is a tendency for the total content (i+ii) of the carboxylic acid unit (I) and the lactone ring unit (II) to become relatively low when the degree of polymerization is high, but there are many cases that are not consistent with this tendency. For example, as disclosed in Patent Publication No. WO 2004/092234, the total content (i+ii) of the carboxylic acid unit (I) and the lactone ring unit (II) can be reduced by bringing a reducing agent into contact with the ethylene-vinyl ester copolymer or the EVOH. Conversely, the total content (i+ii) of the carboxylic acid unit (I) and the lactone ring structure (II) can be increased by, for example, bringing an oxidizing agent into contact with the ethylene-vinyl ester copolymer or the EVOH, and/or performing drying in an atmosphere in which oxidizing is likely to occur. Furthermore, the proportion (ii/(i+ii): lactone ring unit proportion) of the content (ii) of the lactone ring unit (II) with respect to the total content (i+ii) of the carboxylic acid unit and the lactone ring unit (II) can be adjusted by saponification conditions and/or the like. For example, when saponification is performed under conditions in which saponification is promoted, there is a tendency for the lactone ring unit proportion (ii/(i+ii)) to increase.

The total content (i+ii) of the carboxylic acid unit (I) and the lactone ring unit (II) being positioned at the polymer end of the EVOH (c1), and the lactone ring unit proportion (ii/(i+ii)) may be determined by 1H-NMR measurement. It is to be noted that the inventors have found that the measurement results differ depending on a type of solvent used in the measurement. Thus, the measurement should be performed using a mixed solvent of water/methanol (mass ratio of 4/6, wherein the mass ratio is appropriately changed in a case in which a test material does not dissolve). Specifically, the total content (i+ii) of the carboxylic acid unit (I) and the lactone ring unit (II), and the lactone ring unit proportion (ii/(i+ii)) are values measured in accordance with a procedure disclosed in EXAMPLES, described later.

The EVOH (c1) may contain, within a range not hindering the object of the present invention, a structural unit derived from an other monomer aside from ethylene, vinyl ester, and a saponification product thereof. In the case in which the EVOH (c1) has the unit derived from the other monomer, a content thereof with respect to total structural units in the EVOH (c1) is preferably 10 mol % or less, more preferably 5 mol % or less, and still more preferably 3 mol % or less. Furthermore, the content of the structural unit derived from the other monomer may be 0.05 mol % or more. Examples of the other monomer include vinylsilane compounds such as vinyltrimethoxysilane, vinyltriethoxysilane, vinyltri(β-methoxy-ethoxy)silane, and γ-methacryloxypropylmethoxysilane, and the like.

The EVOH (c1) may have, within a range not hindering the object of the present invention, at least one of: a structural unit (I) represented by the following formula (I): a structural unit (II) represented by the following formula (II); and a structural unit (III) represented by the following general formula (III). When the EVOH (c1) has such a structural unit, the thermoformability of the multilayer structure to be obtained can be improved.

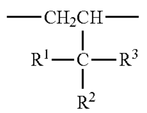
(I)

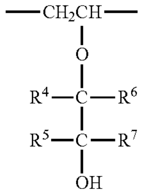
(II)

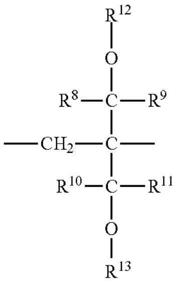
(III)

In the formula (I), $R^1$, $R^2$, and $R^3$ each independently represent a hydrogen atom, a hydroxy group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Furthermore, two selected from $R^1$, $R^2$, and $R^3$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxy group, a carboxyl group, or a halogen atom.

In the formula (II), $R^4$, $R^5$, $R^6$, and $R^7$ each independently represent a hydrogen atom, a hydroxy group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Furthermore, $R^4$ and $R^5$, or $R^6$ and $R^7$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxy group, an alkoxy group, a carboxyl group, or a halogen atom.

In the formula (III), $R^8$, $R^9$, $R^{10}$, and $R^{11}$ each independently represent a hydrogen atom, a hydroxy group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Furthermore, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxy group, an alkoxy group, a carboxyl group, or a halogen atom. $R^{12}$ and $R^{13}$ each independently represent a hydrogen atom, a formyl group, or an alkyl group having 2 to 10 carbon atoms.

In the case in which the EVOH (c1) contains the structural unit(s) represented by any of the above formulae (I) to (III), the lower limit of a content thereof is preferably 0.1 mol %, more preferably 0.5 mol %, and still more preferably 1 mol %. Furthermore, the upper limit of the content is preferably 30 mol %, more preferably 15 mol %, and still more preferably 10 mol %. When the content of the structural unit(s) represented by the above formulae falls within the above range, flexibility and processability of the resin composition can be improved, whereby thermoformability of the multilayer structure to be obtained can be improved.

In the structural units represented by the above formulae: the aliphatic hydrocarbon group having 1 to 10 carbon atoms may be exemplified by an alkyl group, an alkenyl group, and the like: the alicyclic hydrocarbon group having 3 to 10 carbon atoms may be exemplified by a cycloalkyl group, a cycloalkenyl group, and the like; and the aromatic hydrocarbon group having 6 to 10 carbon atoms may be exemplified by a phenyl group and the like.

In the structural unit (I), $R^1$, $R^2$, and $R^3$ each independently represent preferably a hydrogen atom, a methyl group, an ethyl group, a hydroxy group, a hydroxymethyl group, or a hydroxyethyl group, and of these, a hydrogen atom, a methyl group, a hydroxy group, or a hydroxymethyl group is preferred in light of further improving the thermoformability in the multilayer structure to be obtained.

In the structural unit (II), $R^4$ and $R^5$ preferably both represent a hydrogen atom. In particular, it is more preferred that $R^4$ and $R^5$ both represent a hydrogen atom, one of $R^6$ and $R^7$ represents the aliphatic hydrocarbon group having 1 to 10 carbon atoms, and the other of $R^6$ and $R^7$ represents a hydrogen atom. The aliphatic hydrocarbon group is preferably an alkyl group or an alkenyl group. In light of placing particular emphasis on the gas barrier properties of the multilayer structure to be obtained, it is particularly preferred that one of $R^6$ and $R^7$ represents a methyl group or an ethyl group, and the other of $R^6$ and $R^7$ represents a hydrogen atom. Furthermore, it is also particularly preferred that one of $R^6$ and $R^7$ represents a substituent represented by $(CH_2)$ OH (where h is an integer of 1 to 8), and the other of $R^6$ and $R^7$ represents a hydrogen atom. In the substituent represented by $(CH_2)_hOH$, h is preferably an integer of 1 to 4, more preferably 1 or 2, and particularly preferably 1.

In the structural unit (III), $R^8$, $R^9$, $R^{10}$, and $R^{11}$ each represent suitably a hydrogen atom or an aliphatic hydrocarbon group having 1 to 5 carbon atoms, and the aliphatic hydrocarbon group is suitably a methyl group, an ethyl group, an n-propyl group, an isopropyl group, an n-butyl group, an isobutyl group, a tert-butyl group, or an n-pentyl group.

The EVOH (c1) may be used alone of one type, or two or more types thereof may be used together.

A content of the EVOH (c1) in the resin composition layer (C) is preferably 50% by mass or more, more preferably 80% by mass or more, still more preferably 90% by mass or more, and particularly preferably 95% by mass or more. The content of the EVOH (c1) in the resin composition layer (C) may be 100% by mass or less.

A content of the polyvalent metal ion (c2) contained in the resin composition layer (C) is 10 ppm or more and 400 ppm or less. When the content of the polyvalent metal ion (c2) is less than 10 ppm, stress acting between the adhesive resin layer (B) and the resin composition layer (C) during molding of the multilayer structure may increase, whereby the appearance of the multilayer structure may deteriorate. The content of the polyvalent metal ion (c2) is more preferably 20 ppm or more, still more preferably 50 ppm or more, and particularly preferably 80 ppm or more. On the other hand, when the content of the polyvalent metal ion (c2) is more than 400 ppm, a viscosity decrease at a time of melt kneading over a long time period may be intense, whereby the stable moldability may deteriorate. The content of the polyvalent metal ion (c2) is more preferably 300 ppm or less, and still more preferably 250 ppm or less.

The polyvalent metal ion (c2) is at least one selected from the group consisting of a magnesium ion, a calcium ion, a zinc ion, a cobalt ion, and a manganese ion. Due to the at least one selected from the group being contained in the EVOH (c1), viscosity stability during the melt molding is superior. In light of coloring of the multilayer structure to be obtained being unlikely to occur, the polyvalent metal ion (c2) is more preferably a magnesium ion, a calcium ion or a zinc ion, and in light of producibility, stable moldability, the appearance of the multilayer structure to be obtained, and the like, a calcium ion and a zinc ion are more preferred as the polyvalent metal ion (c2).

The polyvalent metal ion (c2) contained in the resin composition layer (C) may be present in a state of being dissociated from an anion, or may be present in a state of a salt being bonded to an anion. Furthermore, the polyvalent metal ion (c2) may be present in a state of being coordinated to a group (for example, a carboxy group, a hydroxy group, etc.) or the like, included in the EVOH (c1) and/or another optional component.

The polyvalent metal ion (c2) is typically derived from a salt, and in light of an operative effect thereof with regard to appearance and the like being superior, is preferably derived from a higher fatty acid metal salt having 12 or more carbon atoms. In other words, the polyvalent metal ion (c2) is preferably contained as a cation of a higher fatty acid metal salt. More specifically, in incorporating the polyvalent metal ion (c2) into the EVOH (c1), a higher fatty acid metal salt having 12 or more carbon atoms is preferably added or contained as a component constituting the polyvalent metal ion (c2). The higher fatty acid metal salt having 12 or more carbon atoms which has been added may be present in the resin composition in a state of a salt in which the polyvalent metal ion (c2) and a fatty acid anion are still bonded, or may be present in the resin composition in a state in which the polyvalent metal ion (c2) and the fatty acid anion are dissociated.

Examples of the higher fatty acid metal salt having 12 or more carbon atoms include metal salts of: fatty acids such as lauryl acid, lauric acid, tridecyl acid, myristic acid, pentadecyl acid, palmitic acid, heptadecyl acid, stearic acid, basic stearic acid, hydroxystearic acid, basic hydroxystearic acid, nonadecanoic acid, oleic acid, behenic acid, montanoic acid, and linoleic acid. In light of, e.g., dispersibility in the EVOH (c1), any one, or two or more types thereof is/are appropriately used.

Aside from these, a fatty acid metal salt having 11 or fewer carbon atoms (an acetic acid salt, a propionic acid salt, etc.), a metal salt other than a fatty acid metal salt (a nitric acid salt, a sulfuric acid salt, etc.), or the like may be used.

The resin composition layer (C) preferably further contains the aluminum ion (c3) in a content of 5 ppb or more and 500 ppb or less. When the aluminum ion (c3) is contained, the thermal stability during melt molding can be improved, whereby the recyclability can be improved. The content of the aluminum ion (c3) is more preferably 10 ppb or more and 250) ppb or less.

The aluminum ion (c3) contained in the resin composition layer (C) may be present in a state of being dissociated from an anion, or may be present in a state of a salt being bonded to an anion. Furthermore, the aluminum ion (c3) may be present in a state of being coordinated to a group (for example, a carboxy group, a hydroxy group, etc.) or the like, included in the EVOH (c1) and/or another optional component.

The aluminum ion (c3) is typically derived from a salt, and in light of an operative effect thereof being superior, is preferably derived from a higher fatty acid metal salt having 12 or more carbon atoms. In other words, the aluminum ion (c3) is preferably contained as a cation of a higher fatty acid metal salt. More specifically, in incorporating the aluminum ion (c3) into the EVOH (c1), a higher fatty acid aluminum salt having 12 or more carbon atoms is preferably added or contained as a component constituting the aluminum ion (c3). The higher fatty acid aluminum salt having 12 or more carbon atoms which has been added may be present in the resin composition in a state of a salt in which the aluminum ion (c3) and a fatty acid anion are still bonded, or may be present in the resin composition in a state in which the aluminum ion (c3) and the fatty acid anion are dissociated.

Examples of the fatty acid aluminum salt having 12 or more carbon atoms include aluminum salts of fatty acids such as: aluminum laurylate, aluminum laurate, aluminum tridecylate, aluminum myristate, aluminum pentadecylate, aluminum palmitate, aluminum heptadecylate, aluminum stearate, basic aluminum stearate, aluminum hydroxystearate, basic aluminum hydroxystearate, aluminum nonadecanoate, aluminum oleate, aluminum behenate, aluminum montanoate, aluminum linoleate, and the like. In light of, e.g., dispersibility in the EVOH (c1), one, or two or more types thereof is/are appropriately used.

Aside from these, a fatty acid aluminum salt having 11 or fewer carbon atoms (aluminum acetate, aluminum propionate, and the like), an aluminum salt other than fatty acid aluminum (aluminum nitrate, aluminum sulfate, etc.), or the like may be used.

It is preferable that the resin composition layer (C) further contains the phosphate ion (c4), and that a content of the phosphate ion (c4) in the resin composition layer (C) is 5 ppm or more and 200 ppm or less. Consequently, coloring resistance during melt molding can be improved. When the content of the phosphate ion (c4) is 5 ppm or more, the coloring resistance during melt molding can be improved. On the other hand, when the content of the phosphate ion (c4) is 200 ppm or less, the viscosity stability can be improved, whereby the appearance of the multilayer structure to be obtained can be improved. The content of the phosphate ion (c4) is more preferably 10 ppm or more and 100 ppm or less.

A component constituting the phosphate ion (c4) is exemplified by various acids such as phosphoric acid and phosphorous acid, salts thereof, and the like. The phosphoric acid salt may be included in any form such as, for example, a monobasic phosphate salt, a dibasic phosphate salt, and a tribasic phosphate salt, and a cationic species thereof is not particularly limited.

It is preferable that the resin composition layer (C) further contains the alkali metal ion (c5), and that a content of the alkali metal ion (c5) in the resin composition layer (C) is 10 ppm or more and 400 ppm or less. Consequently, crosslinking of the resin can be inhibited, whereby the multilayer structure can be obtained having further superior recyclability. The content of the alkali metal ion (c5) is more preferably 20 ppm or more and 200 ppm or less. Examples of the alkali metal ion (c5) include a sodium ion, a potassium ion, and the like, and a sodium ion is preferred. The alkali metal ion (c5) may be contained as a metal salt. Examples of the salt of the alkali metal include metal salts of: organic acids such as acetic acid, propionic acid, butyric acid, lauric acid, stearic acid, oleic acid, and behenic acid; and inorganic acids such as sulfuric acid, sulfurous acid, carbonic acid, boric acid, and phosphoric acid.

The content ratio (c4/c5) of the phosphate ion (c4) to the alkali metal ion (c5) is preferably 0.01 or more and 2 or less. When the content ratio (c4/c5) falls within the above range, the alkali metal ion (c5) is present in range of a certain proportion with respect to the phosphate ion (c4), whereby generation of insoluble salts being finer than conventionally known aggregates, i.e., of compounds which occur by a reaction of the polyvalent metal ion (c2) with the phosphate ion (c4), can be efficiently inhibited. Consequently, when the multilayer structure of the present invention is reused, superior transparency of a regrind composition to be obtained can be secured. When the content ratio (c4/c5) is 0.01 or more, the coloring resistance during the melt molding can be improved. The lower limit of the content ratio (c4/c5) is more preferably 0.05, and still more preferably 0.1. Furthermore, when the content ratio (c4/c5) is 2 or less, the fine insoluble salts derived from the compounds which occur by the reaction of the polyvalent metal ion (c2) with the phosphate ion (c4) during the melt molding are unlikely to be generated, and consequently, the piercing strength, the appearance, the stable moldability, and the like of the multilayer structure can be improved. The upper limit of the content ratio (c4/c5) is more preferably 1.2, and still more preferably 1.0.

The content ratio (c2/c5) of the polyvalent metal ion (c2) to the alkali metal ion (c5), each contained in the resin composition layer (C), is preferably 0.1 or more and 5 or less. When the content ratio (c2/c5) falls within the above range, the alkali metal ion (c5) is present in range of a certain amount with respect to the polyvalent metal ion (c2), whereby generation of insoluble salts being finer than conventionally known aggregates, i.e., of compounds which occur by a reaction of the polyvalent metal ion (c2) with the phosphate ion (c4), can be efficiently inhibited. Consequently, when the multilayer structure of the present invention is reused, superior transparency of a regrind composition to be obtained can be secured. When the content ratio (c2/c5) is 0.1 or more, the coloring resistance during the melt molding can be improved. The lower limit of the content ratio (c2/c5) is more preferably 0.2, and still more preferably 0.5. Furthermore, when the content ratio (c2/c5) is 5 or less, the fine insoluble salts derived from the compounds which occur by the reaction of the polyvalent metal ion (c2) with the phosphate ion (c4) during the melt molding are unlikely to be generated, and consequently, the piercing strength and the like of the multilayer structure can be improved. The upper limit of the content ratio (c2/c5) is more preferably 3, and still more preferably 1. A content ratio (c2/c4) of the polyvalent metal ion (c2) to the phosphate ion (c4), each contained in the resin composition layer (C), is preferably 1 or more and 15 or less. When the content ratio (c2/c4) is 1 or more, the viscosity stability and the appearance of the multilayer structure can be improved. The lower limit of the content ratio (c2/c4) is preferably 2. When the content ratio (c2/c4) is 15 or less, the coloring resistance during the melt molding can be improved.

In the resin composition layer (C), it is preferred that all of the content ratio (c4/c5), the content ratio (c2/c5), and the content ratio (c2/c4) fall within the suitable ranges described above. In such a case, the multilayer structure of the present invention can be particularly superior in appearance, mechanical strength, and the like.

As a procedure for incorporating the phosphate ion (c4) and the alkali metal ion (c5) into the resin composition layer (C), for example, a procedure involving incorporating these into the EVOH (c1) in advance can be exemplified.

Examples of the procedure of incorporating the phosphate ion (c4) and the alkali metal ion (c5) into the EVOH (c1) in advance include: (1) a procedure of bringing porous precipitates of the EVOH having a moisture content of 20 to 80% by mass into contact with an aqueous phosphate compound solution, and drying after incorporating the alkali metal compound into the EVOH: (2) a procedure of incorporating the phosphate compound and the alkali metal compound into a uniform solution (water/alcohol solution, etc.) of the EVOH, then extruding the solution into coagulation liquid to give a strand shape, followed by cutting the obtained strand to make pellets and further performing a drying treatment: (3) a procedure of dry-blending the EVOH, the phosphate compound, and the alkali metal compound all together, and then melt kneading the mixture with an extruder or the like: (4) a procedure of, during the production of the EVOH, using acetic acid to neutralize an alkali (sodium hydroxide, potassium hydroxide, or the like) used in a saponification step, and carrying out a washing treatment to adjust amounts of sodium acetate, potassium acetate, and the like generated as byproducts; and the like. To more significantly achieve the effects of the present invention. (1). (2), and (4) are preferred in light of being superior in terms of dispersibility of the phosphate ion and the alkali metal ion.

A thickness per layer of the resin composition layer (C) is preferably 0.1 μm or more and 100 μm or less, more preferably 1 μm or more and 50 μm or less, and still more preferably 3 μm or more and 25 μm or less.

Adhesive Resin Layer (B)

The multilayer structure of the present invention further has the adhesive resin layer (B) in at least one site between the polyolefin layer (A) and the resin composition layer (C). The adhesive resin layer (B) is typically a layer having, as a principal component, an adhesive resin. The adhesive resin used in the adhesive resin layer (B) may be exemplified by a modified olefin polymer containing a carboxyl group, being obtained by chemically bonding an unsaturated carboxylic acid or an anhydride thereof to an olefin polymer by an addition reaction, a grafting reaction, or the like. Examples of the unsaturated carboxylic acid or the anhydride thereof include maleic acid, maleic anhydride, fumaric acid, acrylic acid, methacrylic acid, crotonic acid, itaconic acid, citraconic acid, hexahydrophthalic anhydride, and the like, and of these, maleic anhydride is suitably used. Specifically, one, or a mixture of two or more types selected from the following may be exemplified as suitable compounds; maleic anhydride-grafted modified polyethylene, maleic anhydride-grafted modified polypropylene, a maleic anhydride-grafted modified ethylene-propylene copolymer, a maleic anhydride-grafted modified ethylene-ethyl acrylate copolymer, a maleic anhydride-grafted modified ethylene-vinyl acetate copolymer, and the like.

When the adhesive resin has been mixed thereinto a rubber/elastomer component such as polyisobutylene or ethylene-propylene rubber or a polyolefin resin which differs from the polyolefin resin serving as the basis of the adhesive resin, adhesiveness may be improved.

A content of the adhesive resin in the adhesive resin layer (B) is preferably 50% by mass or more, more preferably 80% by mass or more, still more preferably 90% by mass or more, and particularly preferably 95% by mass or more. The content of the adhesive resin in the adhesive resin layer (B) may be 100% by mass or less.

A thickness per layer of the adhesive resin layer (B) is preferably 0.1 μm or more and 100 μm or less, more preferably 1 μm or more and 50 μm or less, and still more preferably 3 μm or more and 25 μm or less.

Multilayer Structure

In the multilayer structure of the present invention, the polyolefin layer (A) is laminated on at least one face of the resin composition layer (C) via the adhesive resin layer (B). In this case, an other layer, being optional, may be provided between the polyolefin layer (A) and the adhesive resin layer (B). The multilayer structure of the present invention has neither a layer in which a resin having a melting point of 210° C. or higher is a principal component, nor a metal layer having a thickness of 1 μm or more. When a layer in which a resin having a melting point of 210° C. or higher is a principal component, and a metal layer having a thickness of 1 μm or more are contained, at a time of grinding and reusing the multilayer structure to be obtained, the recyclability may deteriorate. As referred to herein, the "metal layer" means a layer having a metal as a principal component. Furthermore, the multilayer structure of the present invention preferably does not have a layer in which a polyamide is a principal component.

It is to be noted that the melting point of each of: the olefin resin contained in the polyolefin layer (A): the adhesive resin contained in the adhesive resin layer (B); and the EVOH (c1) contained in the resin composition layer (C) is preferably 150° C. or higher and 205° C. or lower, and more preferably 155° C. or higher and 200° C. or lower.

In producing the multilayer structure, it is only required that finally, a multilayer structure having a layer configuration of (A)/(B)/(C) is obtained. In particular, a multilayer structure having a layer configuration of (A)/(B)/(C)/(B)/(A) is preferred. A lamination procedure thereof may be exemplified by: a procedure of preliminarily producing, e.g., a monolayer film to be used as the resin composition layer (C), a multilayer [(B)/(C)/(B)] film to be used as the resin composition layer (C) and the adhesive resin layer (B), or the like, and melt extruding an other resin thereon: a procedure of using a well-known adhesive to dry-laminate, on the monolayer or multilayer film, a monolayer film or a multilayer film constituted from an other resin; and the like. Furthermore, in a case of carrying out coextrusion by an inflation method, the multilayer structure may be obtained by forming a multilayer film having a layer configuration of [outer side]: (A)/(B)/(C)/(B): [inner side], and then fusing inner sides of the tubular film together by using heat or the like, followed by winding. A molding temperature during the melt molding is generally selected from the range of 150 to 300° C. It is to be noted that adopting the resin composition layer (C) as an intermediate layer, and providing the adhesive resin layer (B) so as to directly come in contact with both sides of the intermediate layer, resulting in having a layer configuration of the adhesive resin layer (B)/(C)/(C) is also preferred. In this case, no other resin layer is contained between the adhesive resin layer (B) and the resin composition layer (C).

A ratio of a thickness of the polyolefin layer (A) to a total thickness of total layers in the multilayer structure of the present invention is preferably 0.75 or more. When the ratio falls within the above range, superiority can be achieved in the mechanical strength and the appearance. The ratio is more preferably 0.80 or more. The upper limit of the ratio may be, for example, 0.95, or may be 0.90. The total thickness of total layers in the multilayer structure of the present invention is, for example, preferably 50 μm or more and 3 mm or less, and more preferably 100 μm or more and 1 mm or less.

The multilayer structure of the present invention is not limited to having the aforementioned layer configuration of (A)/(B)/(C)/(B)/(A): another layer (X) may be further provided on an outer side or inner side of the polyolefin layer (A), and the multilayer structure may have 7 or more layers in a layer configuration such as: (A)/(X)/(B)/(C)/(B)/(X)/(A):(X)/(A)/(B)/(C)/(B)/(A)/(X): (X)/(A)/(X)/(B)/(C)/(B)/(X)/(A)/(X): or the like. In layers having the same symbol in the layer configuration, resin(s) used and compositions may be the same or different. It is to be noted that in the multilayer structure of the present invention, in the case in which the polyolefin layer (A) and the adhesive resin layer (B) are used in a plurality, a different type of resin may be used for each.

In the multilayer structure of the present invention, it is preferred that a layer region which has a modulus of elasticity (Young's modulus) of 0.4 GPa or more and 0.8 GPa or less is present at an interface between the adhesive resin layer (B) and the resin composition layer (C). This region which has the modulus of elasticity of 0.4 GPa or more and 0.8 GPa or less is believed to be a region generated by a reaction between the adhesive resin layer (B) and the resin composition layer (C). The upper limit of a thickness of this region is preferably 50 nm, more preferably 30 nm, and still more preferably 20 nm. When the thickness of this region of the interface is less than or equal to the upper limit, the appearance of the multilayer structure can improve. On the other hand, the lower limit of the thickness of this region is, for example, preferably 3 nm, and more preferably 5 nm.

The modulus of elasticity at the interface between the adhesive resin layer (B) and the resin composition layer (C) can be determined by measurement and analysis using an atomic force microscope (hereinafter, may be merely referred to as "AFM"): the determination can be carried out by using the AFM to measure a cross section of the multilayer structure, and calculating the modulus of elasticity at each measurement point of 256×256=65,536 pix in a measurement area of 3 μm×3 μm. In other words, this modulus of elasticity means the modulus of elasticity of each of multiple measurement points of the interface, and does not mean an average value in the region of the interface. Specifically, this modulus of elasticity can be determined by using an apparatus and procedure described in EXAMPLES.

A form of the multilayer structure of the present invention is not particularly limited, and a film form is preferred, and a film form being rectangular or strip-shaped and having a lengthwise direction and a crosswise direction that intersects orthogonally with this lengthwise direction, is further preferred.

In the case in which the multilayer structure of the present invention is in the film form having the lengthwise direction and the crosswise direction, of a cross section in the crosswise direction, provided that a site at one end of the crosswise direction is defined as 0% and a site at an other end of the crosswise direction is defined as 100%, a ratio (Cmin/Cmax) of a minimum value Cmin of a thickness of the resin composition layer (C) to a maximum value Cmax of the thickness, observed in an area of 45% to 55%, is preferably 0.70 or more. When the ratio is more than or equal to the lower limit, light scattering occurring at the interface between the adhesive resin layer (B) and the resin composition layer (C) can be controlled, whereby poor appearance of the multilayer structure can be inhibited. Furthermore, when the ratio is more than or equal to the lower limit, the recyclability can be enhanced. The ratio is more preferably 0.80 or more, and still more preferably 0.85 or more. Furthermore, the ratio may be 1.0 or less, or may be 0.99 or less.

The piercing strength of the multilayer structure of the present invention can be adjusted in accordance with a usage purpose and is not particularly limited, and is preferably 4 to 40 N. The multilayer structure having the piercing strength falling within the above range can be suitably used as a packaging material or the like. The piercing strength is more preferably 5 N or more, still more preferably 6 N or more, and particularly preferably 7.5 N or more. The piercing strength of the multilayer structure in the present invention is measured in accordance with JIS Z 1707, and specifically, a procedure described in EXAMPLES is employed.

The piercing strength per unit thickness of the multilayer structure of the present invention can be adjusted in accordance with a usage purpose and is not particularly limited, and is preferably 30 to 200 N/mm. The multilayer structure having the piercing strength per unit thickness being less than 30 N/mm is not preferable since a necessary thickness for use as a packaging material or the like may increase, and production costs may increase. The lower limit of the piercing strength is more preferably 40 N/mm or more, and still more preferably 50 N/mm or more.

An oxygen transmission rate (OTR) of the multilayer structure of the present invention can be adjusted in accordance with the use purpose and is not particularly limited, and is preferably 5 $cc/m^2$·day·atm or less. The multilayer structure having the OTR falling within the above range can be suitably used as a packaging material or the like. The OTR is more preferably 4 $cc/m^2$·day·atm or less, the OTR is still more preferably 3 $cc/m^2$, day·atm or less, and the OTR is particularly preferably 2 $cc/m^2$·day·atm or less. The OTR is measured in accordance with JIS K 7126-2 (isobaric method: 2006), and specifically, a procedure described in EXAMPLES is employed.

Furthermore, in order to improve molding processability and various physical properties, to each layer of the multilayer structure of the present invention may be added, within a range not leading to impairment of the effects of the present invention, various additives, modifying agents, fillers, other resin(s), and/or the like.

A regrind (scraps) obtained by regrinding ends and/or defective products generated in producing the multilayer composition of the present invention is preferably reused. In other words, a regrind composition containing the multilayer structure of the present invention is also a mode of the present invention. The regrind composition may be obtained by regrinding the multilayer structure of the present invention. With regard to the regrinding of the multilayer structure, off-spec products generated in the production may be reground in this manner, but regrinding multilayer compositions which have been distributed to the market is a suitable embodiment. The regrind composition containing the regrind of the multilayer structure of the present invention is suitably used as a raw material or the like of the multilayer structure.

The multilayer structure of the present invention can also be ground and re-molded with the aim of reuse. Furthermore, the multilayer structure of the present invention is superior in mechanical strength and thermoformability. On the other hand, in a case in which the multilayer structure does not contain a polyamide resin layer, there is little generation of aggregates, which are believed to result due to crosslinking caused by a chemical reaction of the polyamide resin and the EVOH at a time of performing melt molding: thus, the regrind composition to be obtained through reuse can be further superior in appearance. In light of a further reduction in the generation of such aggregates, it is preferable for none of the layers constituting the multilayer structure to contain a polyamide resin. It is to be noted that a melting point of a polyamide resin is typically 210° C. or higher. The regrind composition containing the regrind of the multilayer structure of the present invention is preferably produced by melt kneading the regrind of the multilayer structure. In other words, a method for producing a regrind composition including a step of melt kneading the regrind of the multilayer structure of the present invention is also a mode of the present invention. A procedure for melt molding the regrind may be exemplified by extrusion molding, inflation molding, blow molding, melt spinning, injection molding, and the like. A melting temperature varies based on, e.g., a melting point of the copolymer, and is preferably about 150 to 270° C. The regrind composition may contain an unused resin, but a content of the regrind in the regrind composition is preferably 10% by mass or more.

A packaging material constituted from the multilayer structure of the present invention is a suitable embodiment of the present invention. The packaging material can be processed into a form having, e.g., a tubular shape or a bag shape, and is useful as a material for various types of packaging for foods, drinks, medical drugs, cosmetics, industrial chemicals, pesticides, detergents, and the like, but can be used for a wide range of usage purposes, and is not limited to these usage purposes.

A package resulting from filling the packaging material with contents is a suitable embodiment of the packaging material. The package of the present invention is useful due to a possibility of preventing oxygen-induced flavor degradation of the contents. Examples of the contents with which the packaging material can be filled include contents which are susceptible to deterioration in the presence of oxygen, such as: wine, fruit juices, and other drinks: fruits, nuts, vegetables, meat products, baby foods, coffee, jam, mayonnaise, ketchup, edible oils, dressings, sauces, preserved foods boiled in soy sauce, dairy products, and other foods; and further, medical drugs, cosmetics, gasoline, and the like: however, the contents are not limited thereto.

EXAMPLES

Hereinafter, the present invention is explained in further detail by way of Examples, but the present invention is not in any way limited to these Examples. Measurement Conditions for Quantitative Determination of Primary Structure of EVOH (NMR Method)

Apparatus name: ECZ-600, superconductive nuclear magnetic resonance apparatus manufactured by JEOL, Ltd.

Observation frequency: 600 MHZ (1H)

(1) Solvent: deuterated dimethyl sulfoxide (DMSO-$d_6$)

Polymer concentration: 5% by mass

Measurement temperatures: 25° C., 80° C.

Flip angle: 30°: cumulative number: 256 s

Internal standard substance: tetramethylsilane (TMS)

(2) Solvent: deuterated water ($D_2O$)+deuterated methanol (MeOD) (mass ratio: 4/6)

Polymer concentration: 5% by mass

Measurement temperature: 80° C.

Flip angle: 30°

Cumulative number: 1,024 s

Internal standard substance: tetramethylsilane (TMS)

Quantitative Determination of Ethylene Unit Content, Degree of Saponification, Terminal Carboxylic Acid Unit Content, and Terminal Lactone Ring Unit Content The ethylene unit content (Et Cont.), the degree of saponification (SP), the terminal carboxylic acid unit content (α), and the terminal lactone ring unit content (β) of the EVOH were calculated in accordance with the following formulae by using $^1$H-NMR measurement (measurement results with DMSO-de solvent at 25° C., 80° C.; measurement results with $D_2O$ +MeOD solvent). It is to be noted that the chemical shift values are based on a TMS peak of 0 ppm. Furthermore, in the formulae, VAc, VA1, and Et represent vinyl acetate units, vinyl alcohol units, and ethylene units, respectively.

I1, I3: integrated value of methylene hydrogens at 0.4 to 2.35 ppm (11: measurement value obtained using DMSO-$d_6$ at 25° C., 13: measurement value obtained using DMSO-$d_6$ at 80)° C.

I9: integrated value of methylene hydrogens at 0.4 to 2.8 ppm (measurement value obtained using $D_2O$+MeOD solvent)

I2: integrated value of methine hydrogens of vinyl alcohol units (methine hydrogen in which both sides of the unit are vinyl alcohol) at 3.4 to 4.0 ppm (measurement value obtained using DMSO-$d_6$ at 25° C.)

I4: integrated value of methine hydrogens of vinyl alcohol units (methine hydrogen in which both sides of the unit are vinyl alcohol) at 3.15 to 3.45 ppm (measurement value obtained using DMSO-$d_6$ at 80° C.)

I5: integrated value derived from hydrogens of terminal methyl groups in vinyl acetate units (measurement value obtained using DMSO-$d_6$ at 80° C.)

I6: integrated value around 1.8 to 1.85 (measurement value obtained using DMSO-$d_6$ at 80° C.)

I7: integrated value derived from hydrogens of methyl groups in —$CH(OH)CH_3$ groups present at polymer ends of EVOH (measurement value obtained using DMSO-$d_6$ at 80) ° C.

I8: integrated value derived from hydrogens of methyl groups in —$CH_2CH_3$ groups present at polymer ends of EVOH (measurement value obtained using DMSO-$d_6$ at 80° C.)

I10: integrated value around 0.8 to 0.95 (measurement value obtained using $D_2O$+MeOD solvent)

I11: integrated value derived from hydrogens of $CH_2$ units adjacent to carbonyl groups of terminal lactone ring units (measurement value obtained using $D_2O$+MeOD solvent)

I12: integrated value derived from linear COOH groups of terminal carboxylic acid units (measurement value obtained using $D_2O$+MeOD solvent)

I13, I14: integrated value derived from carboxylic acid salts of terminal carboxylic acid units (measurement value obtained using $D_2O$+MeOD solvent)

It is to be noted that each of the ethylene unit content (Et Cont.), the terminal carboxylic acid unit content (α), and the terminal lactone ring unit content (β) determined is a percentage (mol %) of an amount (mol) of each unit with respect to a total amount (mol) of all of the ethylene units, the vinyl ester units, and the vinyl alcohol units. With regard to this point, contents of units other than the ethylene units, the vinyl ester units, and the vinyl alcohol units are extremely low in comparison to these units. Thus, each of the ethylene unit content (Et Cont.), the terminal carboxylic acid unit content (α), and the terminal lactone ring unit content (β) determined is substantially equivalent to a percentage (mol %) of an amount (mol) of each unit with respect to total amount (mol) of total structural units.

$$VAc = \frac{15}{3}$$

$$VAl = 12 \times \frac{13}{11} + 14$$

$$Et = \frac{13 - 15 \times 5/3 - VAl \times 2 - 17 - 18 \times 5/3 - 16}{4} + \frac{18}{3}$$

$$VAc\ \text{Cont.} = \frac{VAc}{VAc + VAl + Et} \times 100$$

$$VAl\ \text{Cont.} = \frac{VAl}{VAc + VAl + Et} \times 100$$

$$Et\ \text{Cont.} = \frac{Et}{VAc + VAl + Et} \times 100$$

$$SP = 100 - \frac{VAc}{VAc + VAl} \times 100$$

$$CH_2 = \frac{VAl\ \text{Cont.}}{100} \times 2 + \frac{VAc\ \text{Cont.}}{100} \times 5 + \frac{Et\ \text{Cont.}}{100} \times 4$$

$$EVOH = \frac{19 - 110 \times 1/3}{CH_2}$$

$$\alpha = \frac{(112 - 111/2)/2 + (113 + 114)/2}{EVOH} \times 100$$

$$\beta = \frac{111/2}{EVOH} \times 100$$

Example 1

(1) Production of EVOH Resin Composition Pellets

An EVOH resin (MFR: 1.67 g/10 min (at 190° C., under a load of 2.16 kg), oxygen transmission rate: 0.29 cc·20 μm/(m$^2$·day·atm) (under conditions of 20° C. and 65% RH), containing sodium acetate in a content of 160 ppm in terms of sodium ion equivalent and a phosphate ion in a content of 30 ppm, and not containing a polyvalent metal ion) and calcium stearate (manufactured by FUJIFILM Wako Pure Chemical Corporation) were melt kneaded such that a content of the polyvalent metal ion (c2) in a resin composition to be obtained became 140 ppm. A 25 mm extruder manufactured by Toyo Seiki Seisaku-sho, Ltd. (D (mm)=25, L/D=25, compression ratio=2.0, screw: fully intermeshing co-rotation type) was used to conduct the melt kneading such that a resin temperature became 220° C., whereupon EVOH resin composition pellets were obtained.

It is to be noted that the EVOH used had an ethylene unit content of 32 mol %, a degree of saponification of 99.9 mol %, a terminal lactone ring unit content of 0.11 mol %, a terminal carboxylic acid unit content of 0.08%, a total content of the terminal carboxylic acid unit and the terminal lactone ring unit of 0.19 mol % (34.6 μmol/g), and a lactone ring unit proportion of 58 mol %.

(2) Production of Multilayer Structure

Using the EVOH resin composition pellets obtained in (1), a multilayer structure (hereinafter, may be also referred to as "film") containing the resin composition (C) was produced. Using a coextruding multilayer cast film-forming apparatus, a multilayer structure (a five-layer coextruded multilayer cast film having a layer configuration of (A)/(B)/(C)/(B)/(A) and layer thicknesses of 85 μm/10 μm/10 μm/10 μm/85 μm, respectively) was obtained, wherein: the polyolefin layer (A) was constituted from a linear low-density polyethylene (mLLDPE-1: "EVOLUE SP0510", manufactured by Prime Polymer Co., Ltd.) polymerized using a metallocene catalyst: the adhesive resin layer (B) was constituted from a maleic anhydride-modified polyethylene ("Admer NF518", manufactured by Mitsui Chemicals, Inc. Co. Ltd.); and the resin composition layer (C) was constituted from the EVOH resin composition. Film-forming conditions at this time are shown below.

Coextrusion Conditions

- extrusion temperatures of polyolefin layer (A): feeding zone/compression zone/metering zone/die=170/220/220/220° C.
- extrusion temperatures of adhesive resin layer (B): feeding zone/compression zone/metering zone/die=170/220/220/220° C.
- extrusion temperatures of resin composition layer (C): feeding zone/compression zone/metering zone/die=170/220/220/220° C.

Extruders:

- extruder of polypropylene resin layer (A): 32φ extruder, model GT-32-A (manufactured by Research Laboratory of Plastics Technology Co., Ltd.)
- extruder of adhesive resin layer (B): 25φ extruder, model P 25-18-AC (manufactured by Osaka Seiki Kosaku K.K.)
- extruder of resin composition layer (C): 20φ, laboratory extruder, ME model CO-EXT (manufactured by Toyo Seiki Seisaku-sho, Ltd.)
- T die: width=300 mm for five layers each selected from three types (manufactured by Research Laboratory of Plastics Technology Co., Ltd.)
- temperature of cooling rolls: 80° C.
- drawing speed: 1.5 m/min (3) Pretreatment of Film The multilayer structure (film) produced in (2) was embedded in an epoxy resin and cut with an ultra microtome to produce a smooth film cross section.

(4) Measurement with Atomic Force Microscope (AFM)

The film pretreated in (3) was set on a measurement pedestal such that the cross section was a measurement surface, and the measurement of the film cross section was performed with the following apparatus and under the following measurement conditions. The measurement was performed in Peak Force QNM mode, set by the following apparatus, and an analysis was carried out based on DMT contact theory to determine the modulus of elasticity. From the measurement result thus obtained, a thickness of a region, at the interface between the adhesive resin layer (B) and the resin composition layer (C), which had a modulus of elasticity of 0.4 GPa or more and 0.8 GPa or less was determined. The results are shown in Table 1.

- Measurement Apparatus: Dimension Icon (manufactured by Burker Corporation)
- Cantilever: OMCL-AC200TS (manufactured by Olympus Corporation) (nominal
- value of spring constant: 9 N/m)
- Ramp rate: 0.5 Hz
- Peak Force Frequency: 1 kHz
- Maximum Indentation Load: 15 nN
- Measurement Area: 3×3 μm No. of Pixels Measured: 256×256 Pix=65,536

(5) Ratio (Cmin/Cmax) of Minimum Value Cmin of Thickness of Resin Composition Layer (C) to Maximum Value Cmax of Same Of a cross section in the crosswise direction of the multilayer structure produced in (2), provided that a site at one end of the crosswise direction was defined as 0% and a site at an other end of the crosswise direction is defined as 100%, five sites of the multilayer structure were sampled in a rectangular shape such that an area of 45% to 55% formed one side. Crosswise faces of the samples obtained were cut with a microtome, and cut-cross sections thereof were observed with an optical microscope. In the aforementioned area, sites at which the resin composition layer (C) in the cut-cross sections of the multilayer structure had a maximum thickness and a minimum thickness were extracted, and thicknesses thereof were measured. A maximum value and a minimum value were determined for each of the five samples, then an average value of the maximum values of the thicknesses was defined as the maximum value (Cmax) of the thickness of the resin composition layer (C) and an average value of the minimum values of the thicknesses was defined as the minimum value (Cmin) of the resin composition layer (C), and the ratio thereof (Cmin/Cmax) was calculated. The results are shown in Table 1.

(6) Film Appearance Evaluation

The multilayer structure obtained in (2) was cut into a square shape of 10 cm×10 cm, and the appearance thereof was observed by visual inspection. Assessment criteria were as shown below. The results are shown in Table 1.

A: No streaks or unevenness observed.

B: Streaks and/or unevenness observed in a part of the film.

C: Streaks and/or unevenness observed throughout film.

(7) Piercing Strength of Multilayer Structure

In accordance with JIS Z 1707, the multilayer structure obtained in (2) was subjected to humidity conditioning under conditions involving 23° C. and 50% RH and cut into a circular shape having a diameter of 10 cm to give a test piece. The test piece was secured by using a jig, and a needle having a diameter of 1.0 mm and a semicircular tip shape with a radius of 0.5 mm was thrust into the test piece at a speed of 50 mm/min using AUTOGRAPH ("AGS-H", manufactured by Shimadzu Corporation) to determine a maximum stress (N) until the needle penetrated the test piece. This maximum stress (N) was defined as the piercing strength of the multilayer structure. The results are shown in Table 1.

(8) Change in Viscosity During Kneading of EVOH Resin Composition

The EVOH resin composition obtained in (1) was kneaded by using roller mixer $R^{60}$, manufactured by Toyo Seiki Seisaku-sho, Ltd., under the following conditions. A ratio of a torque value 60 min after start of the kneading to the torque value 10 min after start of the kneading was defined as $T_{60}/T_{10}$, and the change in viscosity during the kneading was assessed as shown below.

The assessment being better indicates superior stability during melt molding and less stress applied to the interface with the adhesive layer. The results are shown in Table 1.

Mixer Conditions screw rotation speed: 100 rpm temperature setting: 230° C.

time period: 60 min atmosphere: nitrogen

A: $0.2<T_{60}/T_{10}\leq 0.9$

B: $0.1\leq T_{60}/T_{10}\leq 0.2.0.9<T_{60}/T_{10}\leq 1.5$

C: $T_{60}/T_{10}<0.1.1.5<T_{60}/T_{10}$ (9) Recyclability Evaluation

By using a 20 mm φ extruder, a regrind obtained by grinding the multilayer structure obtained in (2) was formed into a film having a thickness of 20 μm. The number of aggregates found per unit area (number/$m^2$) of the film thus obtained was counted. It was evaluated that the number of the aggregates being lower indicates the recyclability being more superior. The results are shown in Table 1.

A: less than 500/$m^2$

B: 500/$m^2$ or more and less than 750/$m^2$

C: 750/$m^2$ or more and less than 1,000/$m^2$

D: 1,000/$m^2$ or more

Examples 2 to 11, 16, and 17, and Comparative Examples 1 to 5

EVOH resin composition pellets and multilayer structures were produced similarly to Example 1, except that types (physical properties) of the polyolefin (A) and the EVOH (c1), a type and content of the polyvalent metal ion (c2), and contents of the phosphate ion (c4) and the alkali metal ion (c5) were each changed as shown in Tables 1 to 4, and the various evaluations were carried out. It is to be noted that in Comparative Example 5, instead of the polyvalent metal ion (c2), stearic acid was added in a content of 2,800 ppm. The results are shown in Tables 1 to 4.

Example 12

A multilayer structure was produced similarly to Example 1, except that the thickness of the polyolefin layer (A) in the aforementioned multilayer structure was changed to 42 μm, and the various evaluations were carried out. The results are shown in Table 2.

Examples 13, 14

The same EVOH resin as that of Example 1, calcium stearate (manufactured by FUJIFILM Wako Pure Chemical Corporation), and aluminum stearate ("ARUSUTE #50", manufactured by Kawamura Kasei Industry Co., Ltd.) were melt kneaded such that the contents of each of the polyvalent metal ion (c2) and the aluminum ion (c3) in the resin composition to be obtained were as shown in Table 3. A 25 mm extruder manufactured by Toyo Seiki Seisaku-sho, Ltd. (D (mm)=25, L/D=25, compression ratio=2.0, screw: fully intermeshing co-rotation type) was used to conduct the melt kneading such that a resin temperature became 220° C., whereupon EVOH resin composition pellets were obtained.

A multilayer structure was produced similarly to Example 1 by using the EVOH resin composition pellets thus obtained, and the various evaluations were carried out. The results are shown in Table 3.

Example 15

A multilayer structure was produced similarly to Example 1, except that the terminal lactone ring unit content and the terminal carboxylic acid unit content were changed, and the various evaluations were carried out. It is to be noted that production of the EVOH resin was performed by a procedure disclosed in Patent Document WO2019/131844. The results are shown in Table 3.

Comparative Example 6

As another resin layer (D), a layer constituted from a polyamide ("UBE Nylon SF1018A" (melting point: 221°

C.), manufactured by Ube Industries, Ltd.) was further included, and the layer thickness and the layer configuration of the multilayer structure were changed to (A)/(B)/(D)/(C)/(D)/(B)/(A)=75 μm/10 μm/10 μm/10 μm/10 μm/10 μm/75 μm to produce the multilayer structure. It is to be noted that for the production of the multilayer structure, a coextruder for seven layers each selected from four types was used. Film-forming conditions at this time are shown below.

Coextrusion Conditions

- extrusion temperatures of polyolefin layer (A): feeding zone/compression zone/metering zone/die=170/230/230/235° C.
- extrusion temperatures of adhesive resin layer (B): feeding zone/compression zone/metering zone/die=170/230/230/235° C.
- extrusion temperatures of resin composition layer (C): feeding zone/compression zone/metering zone/die=170/230/230/235° C.
- extrusion temperatures of other resin layer (D): feeding zone/compression zone/metering zone/die=235/240/240/235° C.

Extruders:

- extruder of polypropylene resin layer (A): 32φ extruder, model GT-32-A (manufactured by Research Laboratory of Plastics Technology Co., Ltd.)
- extruder of adhesive resin layer (B): 25φ extruder, model P 25-18-AC (manufactured by Osaka Seiki Kosaku K.K.)
- extruder of resin composition layer (C) and other resin layer (D): 20φ, laboratory extruder, ME model CO-EXT (manufactured by Toyo Seiki Seisaku-sho, Ltd.)
- T die: width=300 mm for seven layers each selected from four types (manufactured by Research Laboratory of Plastics Technology Co., Ltd.)
- temperature of cooling rolls: 80° C.
- drawing speed: 1.5 m/min Using the multilayer structure thus obtained, the various evaluations were carried out. The results are shown in Table 4.

It is to be noted that the melting points of each of the olefin resin contained in the polyolefin layer (A), the adhesive resin contained in the adhesive resin layer (B), and the EVOH contained in the resin composition layer (C), in both the Examples and the Comparative Examples, were 155° C. or higher and 200° C. or lower. Furthermore, the AFM measurement was performed for only some of the Examples and Comparative Examples.

The components in Tables 1 to 4 are as shown below.

- mLLDPE-1: "EVOLUE SP0510", manufactured by Prime Polymer Co., Ltd.
- mLLDPE-2: "EVOLUE SP1510", manufactured by Prime Polymer Co., Ltd.
- mLLDPE-3: "EVOLUE SP4510", manufactured by Prime Polymer Co., Ltd.
- HDPE: "Novatec HB332E", manufactured by Japan Polyethylene Corporation
- St-Ca: Calcium stearate
- St-Mg: Magnesium Stearate
- St-Zn: Zinc stearate
- St-Co: Cobalt stearate
- St-OH: Stearic acid

TABLE 1

| | | | Example 1 | Example 2 | Example 3 | Example 4 | Example 5 | Example 6 |
|---|---|---|---|---|---|---|---|---|
| Polyolefin layer (A) | | type | mLLDPE-1 | mLLDPE-1 | mLLDPE-1 | mLLDPE-1 | mLLDPE-1 | mLLDPE-1 |
| | | density [g/cm$^3$] | 0.903 | 0.903 | 0.903 | 0.903 | 0.903 | 0.903 |
| Adhesive resin layer (B) | | type | Admer NF518 | Admer NF518 | Admer NF518 | Admer NF518 | Admer NF518 | Admer NF518 |
| Other resin layer (D) | | type | — | — | — | — | — | — |
| Resin composition layer (C) | EVOH (c1) | ethylene unit content [mol %] | 32 | 44 | 32 | 32 | 32 | 32 |
| | | degree of saponification [mol %] | 99.9 | 99.9 | 99.9 | 99.9 | 99.9 | 99.9 |
| | | terminal lactone ring unit content [mol %] | 0.11 | 0.09 | 0.11 | 0.11 | 0.11 | 0.11 |
| | | terminal carboxylic acid unit content [mol %] | 0.08 | 0.10 | 0.08 | 0.08 | 0.08 | 0.08 |
| | | total content of terminal carboxylic acid unit and terminal lactone ring unit [mol %] | 0.19 | 0.19 | 0.19 | 0.19 | 0.19 | 0.19 |
| | | total content of terminal carboxylic acid unit and terminal lactone ring unit [μmol/g] | 34.6 | 35.9 | 34.6 | 34.6 | 34.6 | 34.6 |
| | | lactone ring unit proportion [%] | 58 | 47 | 58 | 58 | 58 | 58 |
| | Polyvalent metal ion (c2) | type | St-Ca | St-Ca | St-Mg | St-Zn | St-Co | St-Ca |
| | | content [ppm] (amount in terms of metal equivalent) | 140 | 200 | 100 | 100 | 100 | 50 |
| | Aluminum ion (c3) | content [ppb] (amount in terms of metal equivalent) | 0 | 0 | 0 | 0 | 0 | 0 |
| | Phosphate ion (c4) | type | Phosphoric acid | Phosphoric acid | Phosphoric acid | Phosphoric acid | Phosphoric acid | Phosphoric acid |
| | | content [ppm] (amount in terms of phosphate ion equivalent) | 30 | 15 | 30 | 30 | 30 | 30 |
| | Alkali metal ion (c5) | type | sodium acetate | sodium acetate | sodium acetate | sodium acetate | sodium acetate | sodium acetate |

TABLE 1-continued

| | | Example 1 | Example 2 | Example 3 | Example 4 | Example 5 | Example 6 |
|---|---|---|---|---|---|---|---|
| | content [ppm] (amount in terms of metal equivalent) | 160 | 140 | 160 | 160 | 160 | 160 |
| Content ratio (c4/c5) | | 0.19 | 0.11 | 0.19 | 0.19 | 0.19 | 0.19 |
| Content ratio (c2/c5) | | 0.88 | 1.43 | 0.63 | 0.63 | 0.63 | 0.31 |
| Content ratio (c2/c4) | | 4.67 | 13.33 | 3.33 | 3.33 | 3.33 | 1.67 |
| Ratio of thickness of layer (A) to total thickness of total layers | | 0.85 | 0.85 | 0.85 | 0.85 | 0.85 | 0.85 |
| Region thickness (nm) where modulus of elasticity is 0.4 GPa or more and 0.8 GPa or less, measured using AFM | | 23 | 12 | 12 | 23 | 23 | 23 |
| Cmin/Cmax | | 0.91 | 0.87 | 0.98 | 0.95 | 0.93 | 0.82 |
| Evaluations | film appearance | A | A | A | A | A(1 | B |
| | piercing strength [N] | 11.4 | 11.7 | 11.2 | 11.1 | 11.4 | 11.2 |
| | piercing strength per unit thickness [N/mm] | 57.0 | 58.5 | 56.0 | 55.5 | 57.0 | 56.0 |
| | viscosity change during kneading | A | A | B | A | A | A |
| | recyclability | B | B | B | B | B | B |

(1Coloring was observed in the film.

TABLE 2

| | | | Example 7 | Example 8 | Example 9 | Example 10 | Example 11 | Example 12 |
|---|---|---|---|---|---|---|---|---|
| Polyolefin layer (A) | | Type | mLLDPE-2 | mLLDPE-3 | mLLDPE-1 | mLLDPE-1 | mLLDPE-1 | mLLDPE-1 |
| | | density [g/cm$^3$] | 0.915 | 0.938 | 0.903 | 0.903 | 0.903 | 0.903 |
| Adhesive resin layer (B) | | Type | Admer NF518 | Admer NF518 | Admer NF518 | Admer NF518 | Admer NF518 | Admer NF518 |
| Other resin layer (D) | | Type | — | — | — | — | — | — |
| Resin composition layer (C) | EVOH (c1) | ethylene unit content [mol %] | 32 | 32 | 32 | 32 | 32 | 32 |
| | | degree of saponification [mol %] | 99.9 | 99.9 | 99.9 | 99.9 | 99.9 | 99.9 |
| | | terminal lactone ring unit content [mol %] | 0.11 | 0.11 | 0.11 | 0.11 | 0.11 | 0.11 |
| | | terminal carboxylic acid unit content [mol %] | 0.08 | 0.08 | 0.08 | 0.08 | 0.08 | 0.08 |
| | | total content of terminal carboxylic acid unit and terminal lactone ring unit [mol %] | 0.19 | 0.19 | 0.19 | 0.19 | 0.19 | 0.19 |
| | | total content of terminal carboxylic acid unit and terminal lactone ring unit [μmol/g] | 34.6 | 34.6 | 34.6 | 34.6 | 34.6 | 34.6 |
| | | lactone ring unit proportion [%] | 58 | 58 | 58 | 58 | 58 | 58 |
| | Polyvalent metal ion (c2) | Type | St-Ca | St-Ca | calcium acetate | St-Ca | St-Ca | St-Ca |
| | | content [ppm] (amount in terms of metal equivalent) | 140 | 140 | 140 | 140 | 140 | 140 |
| | Aluminum ion (c3) | content [ppb] (amount in terms of metal equivalent) | 0 | 0 | 0 | 0 | 0 | 0 |
| | Phosphate ion (c4) | Type | Phosphoric acid | Phosphoric acid | Phosphoric acid | Phosphoric acid | Phosphoric acid | Phosphoric acid |
| | | content [ppm] (amount in terms of phosphate ion equivalent) | 30 | 30 | 30 | 250 | 30 | 30 |
| | Alkali metal ion (c5) | Type | sodium acetate | sodium acetate | sodium acetate | sodium acetate | sodium acetate | sodium acetate |
| | | content [ppm] (amount in terms of metal equivalent) | 160 | 160 | 160 | 100 | 20 | 160 |
| Content ratio (c4/c5) | | | 0.19 | 0.19 | 0.19 | 2.50 | 1.50 | 0.19 |
| Content ratio (c2/c5) | | | 0.88 | 0.88 | 0.88 | 1.40 | 7.00 | 0.88 |
| Content ratio (c2/c4) | | | 4.67 | 4.67 | 4.67 | 0.56 | 4.67 | 4.67 |
| Ratio of thickness of layer (A) to total thickness of total layers | | | 0.85 | 0.85 | 0.85 | 0.85 | 0.85 | 0.73 |
| Region thickness (nm) where modulus of elasticity is 0.4 GPa or more and 0.8 GPa or less, measured using AFM | | | — | — | — | 47 | — | — |

TABLE 2-continued

| | | Example 7 | Example 8 | Example 9 | Example 10 | Example 11 | Example 12 |
|---|---|---|---|---|---|---|---|
| Cmin/Cmax | | 0.88 | 0.89 | 0.78 | 0.76 | 0.85 | 0.75 |
| Evaluations | film appearance | A | A | B | B | A | B |
| | piercing strength [N] | 10.1 | 7.3 | 11.1 | 9.9 | 10.3 | 6.8 |
| | piercing strength per unit thickness [N/mm] | 50.5 | 36.5 | 55.5 | 49.5 | 51.5 | 58.6 |
| | viscosity change during kneading | A | A | A | B | A | A |
| | recyclability | B | B | B | B | B | C |

TABLE 3

| | | | Example 13 | Example 14 | Example 15 | Example 16 | Example 17 |
|---|---|---|---|---|---|---|---|
| Polyolefin layer (A) | | Type | mLLDPE-1 | mLLDPE-1 | mLLDPE-1 | mLLDPE-1 | mLLDPE-1 |
| | | density [g/cm$^3$] | 0.903 | 0.903 | 0.903 | 0.903 | 0.903 |
| Adhesive resin layer (B) | | Type | Admer NF518 | Admer NF518 | Admer NF518 | Admer NF518 | Admer NF518 |
| Other resin layer (D) | | Type | — | — | — | — | — |
| Resin composition layer (C) | EVOH (c1) | ethylene unit content [mol %] | 32 | 32 | 32 | 32 | 32 |
| | | degree of saponification [mol %] | 99.9 | 99.9 | 99.9 | 99.9 | 99.9 |
| | | terminal lactone ring unit content [mol %] | 0.11 | 0.11 | 0.08 | 0.11 | 0.11 |
| | | terminal carboxylic acid unit content [mol %] | 0.08 | 0.08 | 0.15 | 0.08 | 0.08 |
| | | total content of terminal carboxylic acid unit and terminal lactone ring unit [mol %] | 0.19 | 0.19 | 0.23 | 0.19 | 0.19 |
| | | total content of terminal carboxylic acid unit and terminal lactone ring unit [μmol/g] | 34.6 | 34.6 | 41.9 | 34.6 | 34.6 |
| | | lactone ring unit proportion [%] | 58 | 58 | 35 | 58 | 58 |
| | Polyvalent metal ion (c2) | type | St-Ca | St-Ca | St-Ca | St-Ca | St-Ca |
| | | content [ppm] (amount in terms of metal equivalent) | 140 | 140 | 140 | 100 | 300 |
| | Aluminum ion (c3) | content [ppb] (amount in terms of metal equivalent) | 100 | 2000 | 0 | 0 | 0 |
| | Phosphate ion (c4) | type | Phosphoric acid | Phosphoric acid | Phosphoric acid | Phosphoric acid | Phosphoric acid |
| | | content [ppm] (amount in terms of phosphate ion equivalent) | 30 | 30 | 30 | 150 | 15 |
| | Alkali metal ion (c5) | type | sodium acetate | sodium acetate | sodium acetate | sodium acetate | sodium acetate |
| | | content [ppm] (amount in terms of metal equivalent) | 160 | 160 | 160 | 160 | 160 |
| Content ratio (c4/c5) | | | 0.19 | 0.19 | 0.19 | 0.94 | 0.09 |
| Content ratio (c2/c5) | | | 0.88 | 0.88 | 0.88 | 0.63 | 1.88 |
| Content ratio (c2/c4) | | | 4.67 | 4.67 | 4.67 | 0.67 | 20.00 |
| Ratio of thickness of layer (A) to total thickness of total layers | | | 0.85 | 0.85 | 0.85 | 0.85 | 0.85 |
| Region thickness (nm) where modulus of elasticity is 0.4 GPa or more and 0.8 GPa or less, measured using AFM | | | — | — | 59 | — | — |
| Cmin/Cmax | | | 0.89 | 0.89 | 0.80 | 0.78 | 0.92 |
| Evaluations | | film appearance | A | A | B | B | A[(2] |
| | | piercing strength [N] | 11.2 | 11.2 | 11.2 | 11.2 | 11.4 |
| | | piercing strength per unit thickness [N/mm] | 56.0 | 56.0 | 56.0 | 56.0 | 57.0 |
| | | viscosity change during kneading | A | B | A | B | A |
| | | recyclability | A | B | B | B | B |

[(2] Coloring of the EVOH resin composition pellets was significant.

TABLE 4

| | | | Comparative Example 1 | Comparative Example 2 | Comparative Example 3 | Comparative Example 4 | Comparative Example 5 | Comparative Example 6 |
|---|---|---|---|---|---|---|---|---|
| Polyolefin layer (A) | | type | mLLDPE-1 | HDPE | mLLDPE-1 | mLLDPE-1 | mLLDPE-1 | mLLDPE-1 |
| | | density [g/cm$^3$] | 0.903 | 0.953 | 0.903 | 0.903 | 0.903 | 0.903 |
| Adhesive resin layer (B) | | type | Admer NF518 | Admer NF518 | Admer NF518 | Admer NF518 | Admer NF518 | Admer NF518 |
| Other resin layer (D) | | type | — | — | — | — | — | UBE Nylon SF1018A (1 |
| Resin composition layer (C) | EVOH (c1) | ethylene unit content [mol %] | 32 | 32 | 32 | 32 | 32 | 32 |
| | | degree of saponification [mol %] | 99.9 | 99.9 | 99.9 | 99.9 | 99.9 | 99.9 |
| | | terminal lactone ring unit content [mol %] | 0.11 | 0.11 | 0.11 | 0.11 | 0.11 | — |
| | | terminal carboxylic acid unit content [mol %] | 0.08 | 0.08 | 0.08 | 0.08 | 0.08 | — |
| | | total content of terminal carboxylic acid unit and terminal lactone ring unit [mol %] | 0.19 | 0.19 | 0.19 | 0.19 | 0.19 | — |
| | | total content of terminal carboxylic acid unit and terminal lactone ring unit [μmol/g] | 34.6 | 34.6 | 34.6 | 34.6 | 34.6 | — |
| | | lactone ring unit proportion [%] | 58 | 58 | 58 | 58 | 58 | — |
| | Polyvalent metal ion (c2) | type | — | St-Ca | St-Ca | St-Ca | St-OH | St-Ca |
| | | content [ppm] (amount in terms of metal equivalent) | — | 140 | 1000 | 5 | — | 140 |
| | Aluminum ion (c3) | content [ppb] (amount in terms of metal equivalent) | 0 | 0 | 0 | 0 | 0 | 0 |
| | Phosphate ion (c4) | type | Phosphoric acid | Phosphoric acid | Phosphoric acid | Phosphoric acid | Phosphoric acid | Phosphoric acid |
| | | content [ppm] (amount in terms of phosphate ion equivalent) | 30 | 30 | 30 | 30 | 30 | 30 |
| | Alkali metal ion (c5) | type | sodium acetate | sodium acetate | sodium acetate | sodium acetate | sodium acetate | sodium acetate |
| | | content [ppm] (amount in terms of metal equivalent) | 160 | 160 | 160 | 160 | 160 | 160 |
| | Content ratio (c4/c5) | | 0.19 | 0.19 | 0.19 | 0.19 | 0.19 | 0.19 |
| | Content ratio (c2/c5) | | 0.00 | 0.88 | 6.25 | 0.03 | 17.50 | 0.88 |
| | Content ratio (c2/c4) | | 0.00 | 4.67 | 33.33 | 0.17 | 0.00 | 4.67 |
| Ratio of thickness of layer (A) to total thickness of total layers | | | 0.85 | 0.85 | 0.85 | 0.85 | 0.85 | 0.85 |
| Region thickness (nm) where modulus of elasticity is 0.4 GPa or more and 0.8 GPa or less, measured using AFM | | | 35 | — | — | 35 | 47 | — |
| Cmin/Cmax | | | 0.57 | 0.92 | 0.92 | 0.68 | 0.40 | 0.94 |
| Evaluations | | film appearance | C | A | A | C | C | A |
| | | piercing strength [N] | 11.6 | 4.1 | 10.9 | 11.7 | 11.4 | 26.1 |
| | | piercing strength per unit thickness [N/mm] | 58.0 | 20.5 | 54.5 | 58.5 | 57.0 | 130.5 |
| | | viscosity change during kneading | A | A | C | A | B | A |
| | | recyclability | B | B | B | B | C | D |

(1 Located between the adhesive resin layer (B) and the resin composition layer (C)

From the results shown in Tables 1 to 4, it is revealed that the multilayer structures of each of the Examples are superior in the film appearance, the mechanical strength, the change in viscosity during kneading (stable moldability), and the recyclability. On the other hand, the multilayer structures of Comparative Examples 1, 4, and 5, which, instead of the resin composition layer (C), involved forming a resin composition layer that does not contain or scarcely contains the polyvalent metal ion (c2), were inferior in the film appearance. The multilayer structure of Comparative Example 2, which, instead of the polyolefin layer (A), involved forming a layer constituted from only “Novatec HB332E” manufactured by Japan Polyethylene Corporation, being a high-density polyethylene, was inferior in the piercing strength. The multilayer structure of Comparative Example 3, which, instead of the resin composition layer (C), involved forming a resin composition layer which excessively contained the polyvalent metal ion (c2), resulted in a large change in viscosity during melt kneading of the resin composition, and was inferior in stability during forming of the multilayer structure. The multilayer structure of Comparative Example 6, which involved forming the polyamide layer as the other resin layer (D), resulted in the generation of numerous aggregates upon melt kneading and reusing the regrind of the multilayer structure, and was inferior in recyclability.

The invention claimed is:

1. A multilayer structure comprising:

a polyolefin layer (A);

an adhesive resin layer (B); and a resin composition layer (C), wherein the polyolefin layer (A) is laminated on at least one face of the resin composition layer (C) via the adhesive resin layer (B), the multilayer structure comprises neither a layer in which a resin having a melting point of 210° C. or higher is a principal component, nor a metal layer having a thickness of 1 μm or more, a resin being a principal component constituting the polyolefin layer (A) comprises a polyolefin resin having a density of 0.850 $g/cm^3$ or more and 0.940 $g/cm^3$ or less, the resin composition layer (C) comprises an ethylene-vinyl alcohol copolymer (c1) and a polyvalent metal ion (c2), an ethylene unit content in the ethylene-vinyl alcohol copolymer (c1) is 20 mol % or more and 50 mol % or less, and a degree of saponification of the ethylene-vinyl alcohol copolymer (c1) is 90 mol % or more, a content of the polyvalent metal ion (c2) in the resin composition layer (C) is 10 ppm or more and 400 ppm or less, the polyvalent metal ion (c2) comprises at least one selected from the group consisting of a magnesium ion, a calcium ion, a zinc ion, a cobalt ion, and a manganese ion, and the multilayer structure is in a film form which has a lengthwise direction and a crosswise direction, and of a cross section in the crosswise direction, provided that a site at one end of the crosswise direction is defined as 0% and a site at an other end of the crosswise direction is defined as 100%, a ratio (Cmin/Cmax) of a minimum value Cmin of a thickness of the resin composition layer (C) to a maximum value Cmax of the thickness, observed in an area of 45% to 55%, is 0.70 or more.

2. The multilayer structure according to claim 1, wherein the polyvalent metal ion (c2) is comprised as a cation of a higher fatty acid metal salt.

3. The multilayer structure according to claim 1, wherein at least a part of the ethylene-vinyl alcohol copolymer (c1) comprises at least one of a carboxylic acid unit (I) and a lactone ring unit (II) each being positioned at a polymer end, a total content (i+ii) of the carboxylic acid unit (I) and the lactone ring unit (II) per gram of the ethylene-vinyl alcohol copolymer (c1) is 14 μmol/g or more and 78 μmol/g or less, and a proportion (ii/(i+ii)) of a content (ii) of the lactone ring unit (II) with respect to the total content (i+ii) of the carboxylic acid unit (I) and the lactone ring unit (II) is 40 mol % or more.

4. The multilayer structure according to claim 1, wherein the resin composition layer (C) further comprises an aluminum ion (c3), and a content of the aluminum ion (c3) in the resin composition layer (C) is 5 ppb or more and 500 ppb or less.

5. The multilayer structure according to claim 1, wherein the resin composition layer (C) further comprises a phosphate ion (c4) and an alkali metal ion (c5), a content of the phosphate ion (c4) in the resin composition layer (C) is 5 ppm or more and 200 ppm or less, and a content of the alkali metal ion (c5) in the resin composition layer (C) is 10 ppm or more and 400 ppm or less, and a content ratio (c4/c5) of the phosphate ion (c4) to the alkali metal ion (c5) is 0.01 or more and 2 or less, and a content ratio (c2/c5) of the polyvalent metal ion (c2) to the alkali metal ion (c5) is 0.1 or more and 5 or less.

6. The multilayer structure according to claim 5, wherein a content ratio of the polyvalent metal ion (c2) to the phosphate ion (c4) is 1 or more and 15 or less.

7. The multilayer structure according to claim 1, wherein a thickness of a region, at an interface between the adhesive resin layer (B) and the resin composition layer (C), which has a modulus of elasticity of 0.4 GPa or more and 0.8 GPa or less is 50 nm or less, the modulus of elasticity being measured and analyzed using an atomic force microscope.

8. The multilayer structure according to claim 1, wherein the polyolefin resin constituting the polyolefin layer (A) is a linear low-density polyethylene.

9. The multilayer structure according to claim 8, wherein the linear low-density polyethylene is polymerized using a metallocene catalyst.

10. The multilayer structure according to claim 1, wherein a ratio of a thickness of the polyolefin layer (A) to a total thickness of total layers is 0.75 or more.

11. A packaging material constituted from the multilayer structure according to claim 1.

12. A regrind composition comprising a regrind of the multilayer structure according to claim 1.

13. A method for producing a regrind composition, the method comprising a step of melt kneading a regrind of the multilayer structure according to claim 1.

14. The multilayer structure according to claim 1, wherein the content of the polyvalent metal ion (c2) in the resin composition layer (C) is 140 ppm or more and 400 ppm or less.

15. The multilayer structure according to claim 14, wherein the polyvalent metal ion (c2) comprises at least one selected from the group consisting of a magnesium ion, a zinc ion, a cobalt ion, and a manganese ion.

16. The multilayer structure according to claim 1, wherein the polyvalent metal ion (c2) comprises at least one selected from the group consisting of a zinc ion, a cobalt ion, and a manganese ion.

17. The multilayer structure according to claim 8, wherein the linear low-density polyethylene includes a homopolymer or a copolymer formed from ethylene and an α-olefin having 3 or more carbon atoms.

18. The multilayer structure according to claim 1, wherein the resin being the principal component constituting the polyolefin layer (A) consists of the polyolefin resin having a density of 0.850 $g/cm^3$ or more and 0.940 $g/cm^3$ or less.

19. The multilayer structure according to claim 1, wherein the polyvalent metal ion (c2) consists of at least one selected from the group consisting of a magnesium ion, a calcium ion, a zinc ion, a cobalt ion, and a manganese ion.

* * * * *